US009965673B2

(12) United States Patent
Du et al.

(10) Patent No.: US 9,965,673 B2
(45) Date of Patent: May 8, 2018

(54) METHOD AND APPARATUS FOR FACE DETECTION IN A FRAME SEQUENCE USING SUB-TASKS AND LAYERS (75) Inventors: Yangzhou Du, Beijing (CN); Jianguo Li, Beijing (CN); Ang Liu, Beijing (CN); Tao Wang, Beijing (CN); Yimin Zhang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 178 days.

(21) Appl. No.: 13/977,684

(22) PCT Filed: Apr. 11, 2011

(86) PCT No.: PCT/CN2011/000617
§ 371 (c)(1),
(2), (4) Date: Nov. 21, 2013

(87) PCT Pub. No.: WO2012/139239
PCT Pub. Date: Oct. 18, 2012

(65) Prior Publication Data
US 2014/0072172 A1 Mar. 13, 2014

(51) Int. Cl.
G06K 9/00 (2006.01)
G06K 9/46 (2006.01)
G06K 9/32 (2006.01)
G06T 7/246 (2017.01)
G06K 9/68 (2006.01)

(52) U.S. Cl.
CPC .......... *G06K 9/00261* (2013.01); *G06T 7/248* (2017.01); *G06K 9/00221* (2013.01); *G06K 9/00228* (2013.01); *G06K 9/00248* (2013.01); *G06K 9/00288* (2013.01); *G06K 9/46* (2013.01); *G06K 9/6857* (2013.01); *G06T 2207/20016* (2013.01); *G06T 2207/30201* (2013.01)

(58) Field of Classification Search
CPC ............... G06K 9/6257; G06K 9/4628; G06K 9/00288; G06K 9/00228; G06K 9/00248; G06K 9/6857; G06K 2009/3291; G06K 9/00221; G06K 9/46; G06T 2207/30196; G06T 2207/20016; G06T 2207/20021
See application file for complete search history.

(56) References Cited

U.S. PATENT DOCUMENTS

| 7,315,631 B1* | 1/2008 | Corcoran | G06K 9/00234 382/118 |
| 2002/0102024 A1* | 8/2002 | Jones | G06K 9/6256 382/225 |

(Continued)

FOREIGN PATENT DOCUMENTS

CN 101236599 6/2008

OTHER PUBLICATIONS

PCT Search Report, PCT/CN2011/000617, Intel Corporation, dated Jan. 19, 2012, 12 pages.

*Primary Examiner* — Kenny Cese
(74) *Attorney, Agent, or Firm* — Womble Bond Dickinson (US) LLP (57) ABSTRACT

Techniques are disclosed that involve face detection. For instance, face detection tasks may be decomposed into sets of one or more sub-tasks. In turn the sub-tasks of the sets may be allocated across multiple image frames. This allocation may be based on a multiple layer, quad-tree approach. In addition, face tracking tasks may be performed.

20 Claims, 8 Drawing Sheets (56) References Cited

U.S. PATENT DOCUMENTS

| | | | |
|---|---|---|---|
| 2003/0189980 A1* | 10/2003 | Dvir | G06T 7/2033 375/240.16 |
| 2004/0218827 A1 | 11/2004 | Cohen et al. | |
| 2007/0098218 A1* | 5/2007 | Zhang | G06K 9/00228 382/103 |
| 2009/0303342 A1* | 12/2009 | Corcoran | G06K 9/00228 348/222.1 |
| 2010/0272363 A1* | 10/2010 | Steinberg | G06K 9/00228 382/190 |
| 2011/0050939 A1* | 3/2011 | Tsurumi | G06K 9/00228 348/222.1 |
| 2011/0249867 A1* | 10/2011 | Haas et al. | 382/103 |

\* cited by examiner

Layer 1    Layer 2    Layer 3

METHOD AND APPARATUS FOR FACE DETECTION IN A FRAME SEQUENCE USING SUB-TASKS AND LAYERS

CROSS-REFERENCE TO RELATED APPLICATION

This patent application is a U.S. National Phase Application under 35 U.S.C. § 371 of International Application No. PCT/CN2011/000617, filed Apr. 11, 2011, entitled "TECHNIQUES FOR FACE DETECTION AND TRACKING".

BACKGROUND

Devices such as digital cameras, and mobile phones (e.g., smartphones), often provide a face detection mode. In this mode, a camera detects a face in a scene and then automatically focuses (AF) and optimizes exposure (AE). Even if a person moves, the camera will track the detected face, focus on it and adjust exposure accordingly. As result, face detection and tracking provide much convenience to a photographer when taking a portrait scene.

Though the terms of "face detection" and "face tracking" are often undistinguished in product advertisements, they are largely different in a technical view. While face detection typically works in the entire area of the image to discover newly appeared faces, face tracking typically works in a very small neighboring area of an old face and probes its movement. Therefore, a single face tracking may take much less computation (e.g., 2-3 orders of magnitude less) than a full image face detection.

Face detection and tracking features may be implemented in mobile platforms (e.g., cameras and mobile phones) as an embedded software solution, or as a hardware-accelerated version to provide accelerated speed performance. However, providing these features in an effective manner can be computationally challenging.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. Embodiments will be described with reference to the accompanying drawings, wherein.

DETAILED DESCRIPTION

Embodiments provide techniques that involve the detection of faces and/or other objects. For instance, face detection tasks may be decomposed into sets of one or more sub-tasks. In turn, the sub-tasks of the sets may be allocated across multiple image frames. Such task decompositions may employ quad-tree techniques. In addition, face/object tracking tasks may be performed. Such techniques may advantageously reduce imbalanced processing loads over time. This may result in a better user experience (e.g., through the reduction or elimination of noticeable performance jitters).

Conventional face/object detection techniques perform full face/object detection in each video frame. To speed up face/object tracking, embodiments may decompose a large detection task into smaller sub-tasks to perform the sub-tasks in multiple (e.g., consecutive) frames. Different task decomposition strategies may be employed. For example, an entire image space may be divided into several blocks, and each block forms a sub-task. Alternatively, the whole scale range of detection windows may be divided into several intervals, where each interval is a sub-task.

However, quad-tree based task decomposition comprises both division in image space as well as division in scale range of detection windows. This may advantageously make substantially equal sub-tasks. Moreover, this decomposition technique may advantageously avoid missing any new faces when all sub-tasks are finished in a detection cycle of N frames. The quad-tree decomposition technique provides a number of "layers". The number of layers employed may be a variable parameter (e.g., from 1 to 4). The employment of a single layer corresponds to pure detection, while the employment of multiple layers (e.g., 2, 3, 4, etc.) flexibly allows for a different number of sub-tasks in to be used in a task decomposition.

The face/object detection/tracking techniques described herein may be used in various devices and applications. Examples include (but are not limited to) smart cameras (e.g., cameras with auto focus and exposure by face tracking), smartphones, tablet computing platforms, notebook computing platforms, desktop computing platforms, game consoles, e-books, smart television; various camera embedded devices, smart digital signage; natural human computer interface (HCI), video surveillance applications, and visual search applications. Embodiments, however, are not limited to these examples.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Operations for the embodiments may be further described with reference to the following figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Figure 1:
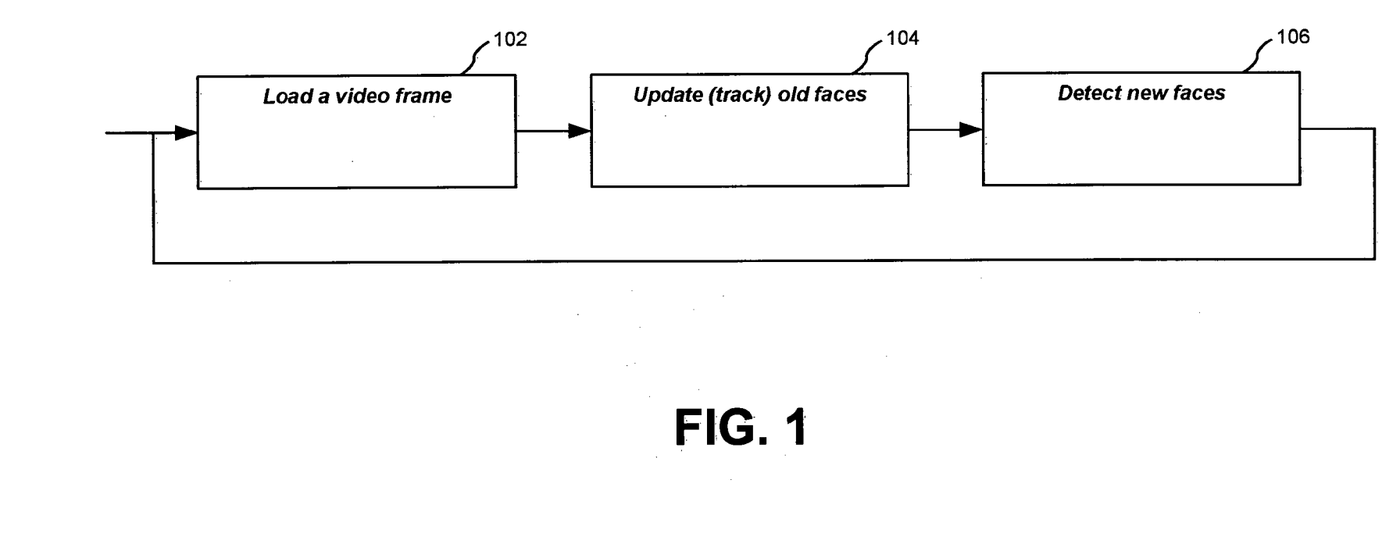
FIG. 1 is a logic flow diagram.

FIG. 1 illustrates an exemplary logic flow 100, which may be representative of operations executed by one or more embodiments described herein. Although FIG. 1 shows a particular sequence of operations, other sequences may be employed. Moreover, the depicted operations may be performed in various parallel and/or sequential combinations.

As shown in FIG. 1, a current video frame is obtained at a block 102. In embodiments, this may involve loading the current video frame into a storage medium, such as a memory buffer. At a block 104, any previously identified faces (also referred to as "old faces") are tracked. This involves updating the position and/or size of old face(s) that were identified in previous frame(s). Also, at a block 106, any new faces that exist in the current frame are detected. As shown in FIG. 1, blocks 102-106 may be performed repeatedly for a sequence of frames.

Typically, detecting new faces/objects in an image frame (e.g., as indicated by block 106) takes much more time than updating old faces/objects (e.g., as indicated by block 104). This is because the detection of new faces requires a complete face/object detection process to be performed for the entire image. More particularly, this detection process may involve scanning an entire image space with detection windows of varying sizes.

Embodiments may perform face/object detection and/or tracking in manners that are based on the well known techniques of Viola and Jones, which were published as Paul Viola and Michael Jones, *Rapid Object Detection using a Boosted Cascade of Simple Features*, Accepted Conference on Computer Vision and Pattern Recognition, 2001. These techniques use a cascade of Adaptive Boosting (AdaBoost) classifiers to detect faces by scanning a window exhaustively over an image.

More particularly, Viola and Jones' techniques may employ an image representation called an integral image, which allows for the quick computation of features used by the detector. A learning algorithm, based on AdaBoost, selects a small number of critical visual features from a larger set to yield efficient classifiers. In turn, these techniques combine increasingly complex classifiers in a cascaded manner. As a result, background regions of the image may be quickly discarded while computation is dedicated to more promising object-like regions. Thus, according to Viola and Jones' techniques, the cascading of classifiers can be viewed as an object specific focus-of-attention mechanism.

Further, face/object detection and/or tracking may involve the employment of neural networks. Such techniques are described in Henry A. Rowley, Shumeet Baluja, and Takeo Kanade, *Neural Network-Based Face Detection*, IEEE Transactions on Pattern Analysis and Machine Intelligence, vol. 20, no. 1, January 1998.

As discussed above, face detection and face tracking (while often undistinguished in product advertisement) are largely different in a technical view. More particularly, face detection works in the entire area of an image to discover newly appeared faces. However, face tracking works in a very small neighboring area of an old face and probes its movement. Therefore, tracking of a single face may take much less computation (e.g., 2~3 orders of magnitude less) than a full image face detection. Thus, for a video stream (e.g., the preview mode of digital camera), it is not computationally economical to run full image face detection in every frame.

To save computation, face detection may be periodically run at an interval of a small amount of frames (e.g., 30 frames) and face tracking is called continuously during this interval. However, this may unfortunately lead to an imbalanced processing load over time, due to face detection taking substantially more time than face tracking. Moreover, in platforms with reduced computational capacities (e.g., less capacity than personal computers), face detection in large images may block the system for a short period of time. As a result, user-perceptible jitters may occur.

As described herein, face detection (e.g., in accordance with the techniques of Viola and Jones and/or Rowley et al.) may involve scanning a detection window (e.g., a rectangular window) over an entire image area to detect faces. To discover faces of different sizes (e.g., large and small), such scanning may be repeatedly performed using different window sizes. For instance, scanning may be repeatedly performed from a smallest window size (e.g., 20×20 pixels) to a largest window size covering an entire image area.

In embodiments, such scanning may be broken down into smaller tasks. In turn, these smaller tasks may be distributed across and performed in multiple image frames. Thus, through this feature, system blocking due to multiple size face detection may be advantageously avoided. However, breaking down a face detection operation into smaller tasks is not a trivial matter.

To deal with this, embodiments may decompose the large task of detecting new faces into smaller sub-tasks. These smaller sub-tasks are performed over multiple image frames (e.g., over a sequence of consecutive image frames). As a result, the computation workload in each video frame is greatly reduced, and any new faces are discovered with only a little delay time.

An important technical challenge involves decomposing a face detection task into sub-tasks that achieve a fairly even workload balance. Embodiments address this challenge through a quad-tree based task decomposition approach. In accordance with this approach, an integer parameter (referred to as a number of layers) may be employed. When the number of layers is one, a pure detection (detection without sub-task decomposition) occurs. However, when other numbers of layers are employed (e.g., 2, 3, 4, etc.), different numbers of sub-tasks are performed.

Through this approach, sub-tasks having substantially even processing demands may advantageously be achieved. Also, this approach may advantageously avoid missing the detection of any new faces when all sub-tasks are finished.

In a typical implementation of face/object detection, a sliding detection window is scanned over an entire image space to detect any faces/objects in the sliding detection window. To discover both small and large faces/objects, the full scanning is repeated several times with varying window size.

Figure 2:
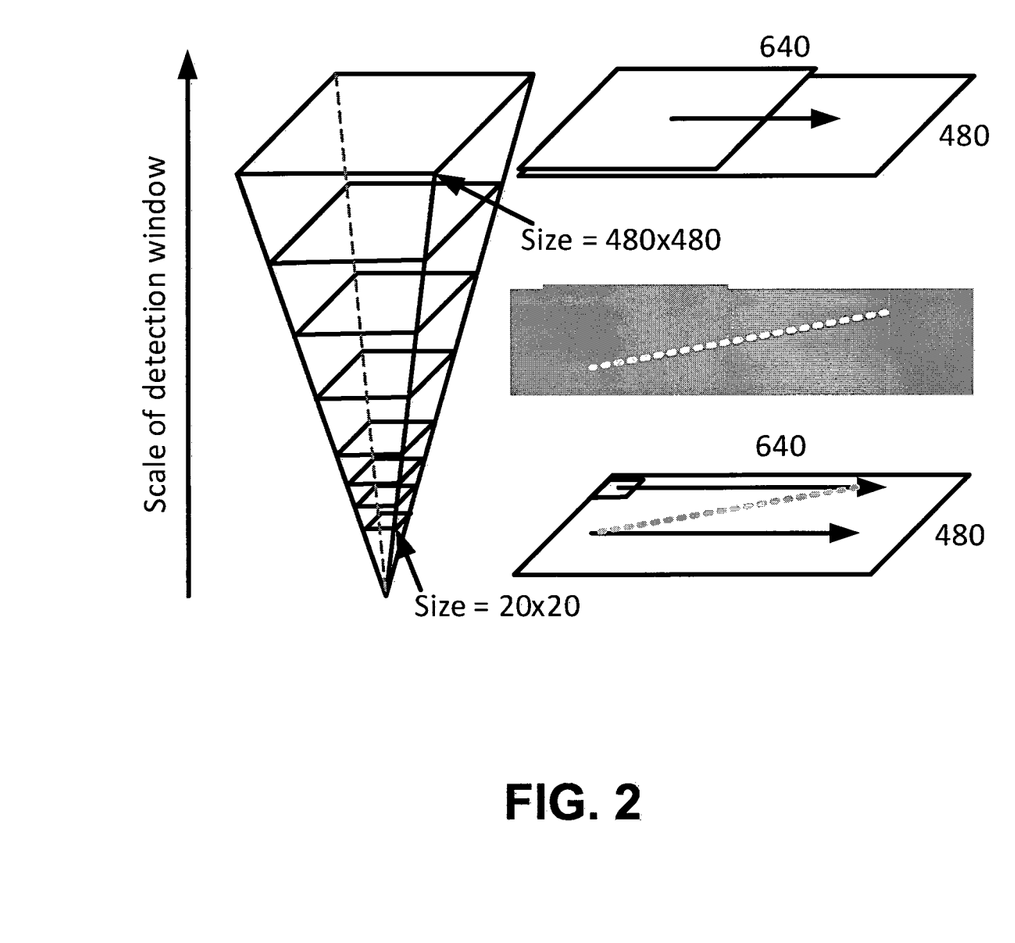
FIG. 2 is a diagram showing an exemplary face detection task.

An example of this is shown in FIG. 2, which involves an exemplary image size of 640×480 pixels. FIG. 2 shows that, in this example, detection window sizes may vary from a smallest one (e.g., 20×20 pixels), to a largest one covering almost the entire image (e.g., 480×480 pixels). FIG. 2 is provided for purposes of illustration, and not limitation. Thus embodiments may employ any combination of other image sizes and detection window sizes.

As described above, embodiments may decompose a scanning process into multiple sub-tasks that are evenly balanced (e.g., each of the sub-tasks may entail substantially equal processing loads).

Figure 3:
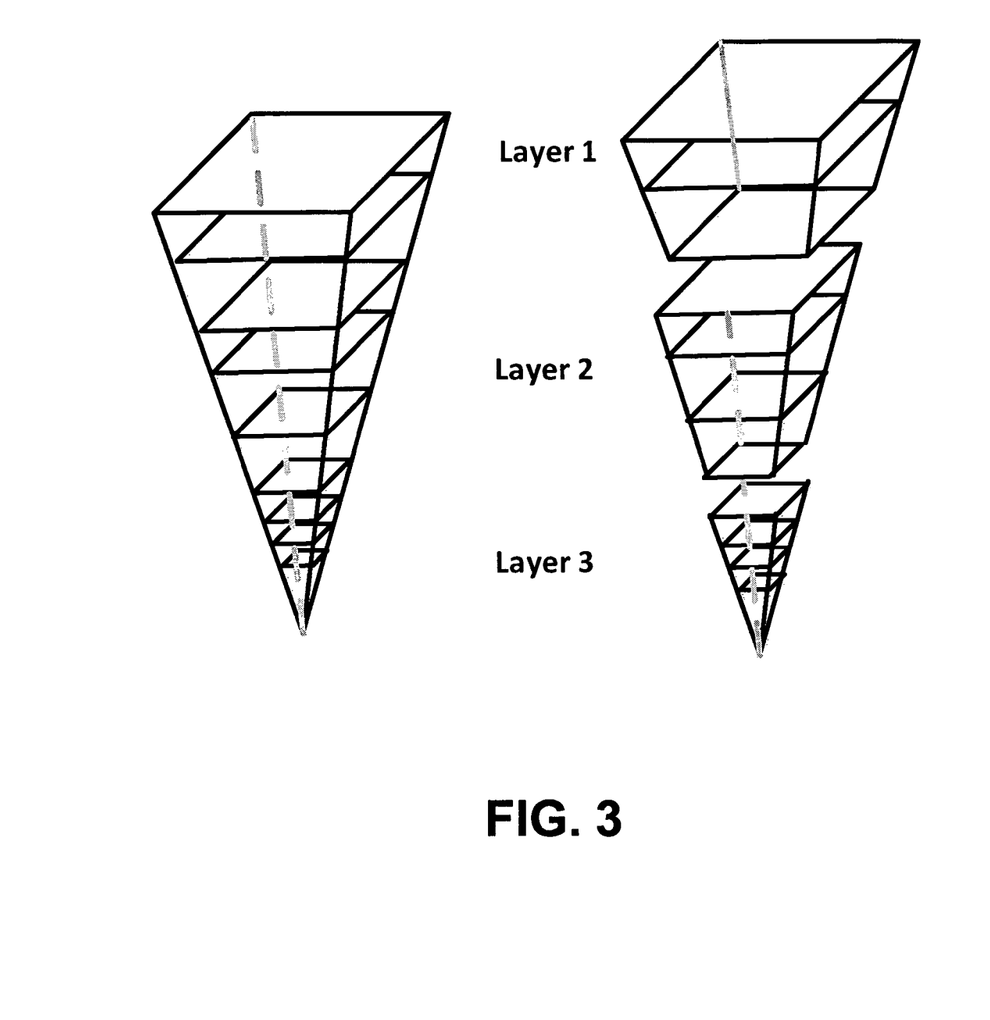
FIG. 3 is a diagram showing an exemplary allocation of detection windows into three layers.

Since the size of detection windows may span a large range of scale, embodiments divide this range into several intervals. Each of these intervals is referred to herein as a "layer". FIG. 3 is a diagram showing an exemplary three layer division. As shown in FIG. 3, each layer contains two or more scale values (i.e., two or more detection window sizes). Thus, the scanning process is performed a few times in each layer.

According to the layer division, a quad-tree structure may be used to break down the whole face/object detection task into a number of sub-tasks. With this quad-tree structure, L layers may be employed. The multiple detection window sizes may be allocated among the L layers.

Thus, each of the L layers involves one or more detection window sizes. Moreover, these one or more detection windows may be within a size range. For instance, at a layer i, these sizes are within a size (or scale) range between sizes $s_{i-1}$ and $s_i$. This range is denoted herein as $[s_{i-1}, s_i]$. These sizes (or scales) are indexed in a decreasing order. For instance, $s_i$ is smaller than $s_{i-1}$. In accordance with this convention, $s_0$ indicates a largest size and $s_L$ indicates a smallest size. The size range for each layer may be determined by allocating the multiple scanning window sizes among the L layers.

According to this layer division, a quad-tree structure may be used to decompose the whole face/object detection task into a number of sub-tasks. In this decomposition, each detection region used at a particular layer is divided into four detection regions in a subsequent layer. Sizing of these detection regions may be based on the image space, and the detection window size ranges allocated to each layer. An example of this quad-tree technique is illustrated in FIG. 4.

Figure 4:
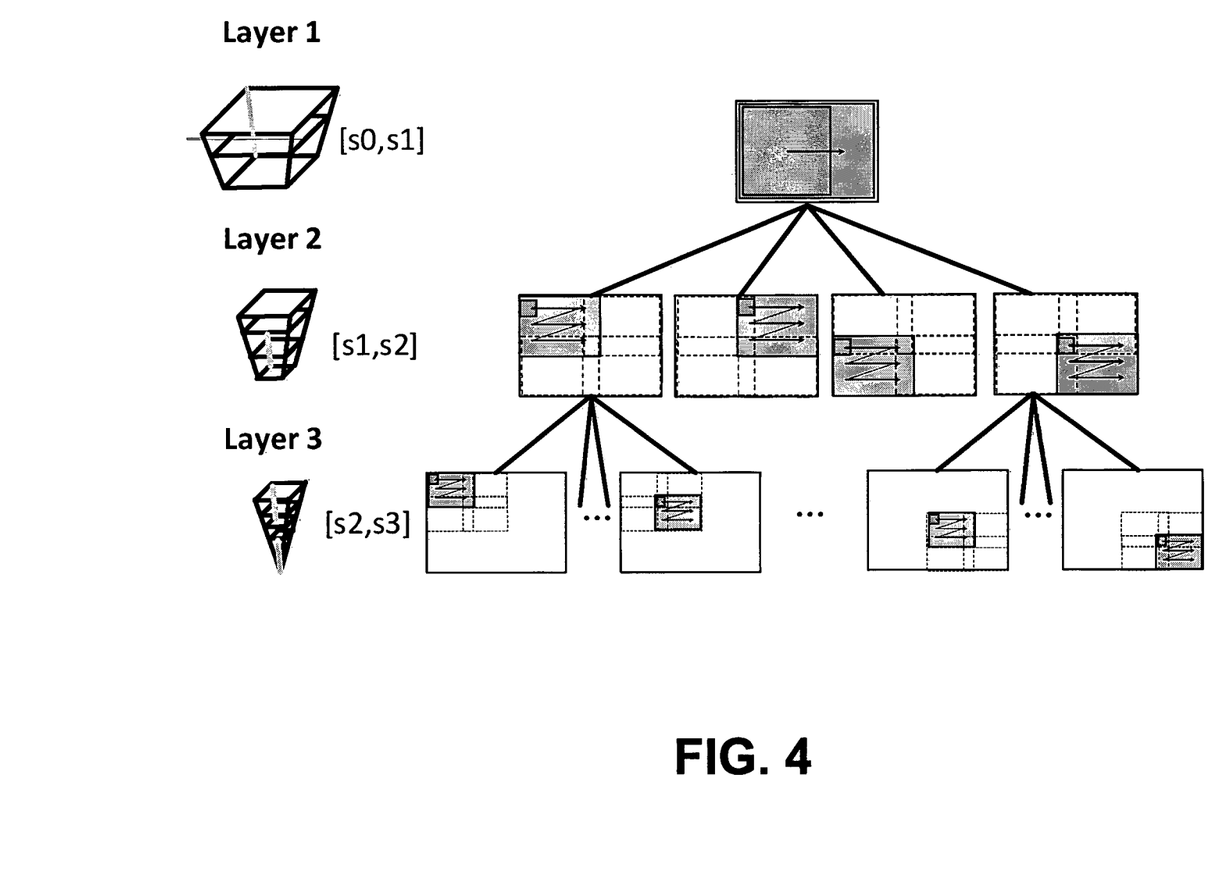
FIG. 4 is a diagram showing an exemplary quad-tree detection task.

FIG. 4 shows that, in a first layer (indicated as "Layer1"), the detection region is the whole image space and only faces sized in accordance with detection windows sized within the range $[s_0, s_1]$ are detected. In other words, detection windows sized within the range $[s_0, s_1]$ scan the detection region for faces/objects.

FIG. 4 further shows that, in a second layer (indicated as "Layer2"), the detection region of the previous layer (i.e., the whole image space) is divided into four detection regions. Each of these four detection regions has a width of $s_1$. Also, as shown in FIG. 4, overlap exists between adjacent ones of these detection regions. The detection windows used at this layer to scan the four detection regions for faces/objects are within the size range $[s_1, s_2]$. Thus, at the second layer, only faces/objects sized in accordance with this range are detected.

This same strategy is applied to successive layers. For example, FIG. 4 shows that, in a third layer (indicated as "Layer3"), the detection regions of the second layer are each divided into four detection regions. This results in sixteen total detection regions. Each of these sixteen detection regions has a width of $s_2$. Also, as shown in FIG. 4, overlap exists between adjacent ones of these detection regions. The detection windows used at this layer to scan the sixteen detection regions for faces/objects are within the size range $[s_2, s_3]$. Thus, at the third layer, only faces/objects sized in accordance with this range are detected.

The example of FIG. 4 illustrates that, at a layer i, each detection region in an immediately preceding upper layer (i.e., layer i-1) is divided into four sub-regions. Each of these four sub-regions may have a width of $s_{i-1}$. Also, overlap may exist between adjacent ones of these detection regions. The detection windows used at this layer to scan the sixteen detection regions for faces/objects are within the size range $[s_{i-1}, s_i]$. Thus, at layer i, only faces/objects sized in accordance with this range are detected.

In embodiments, sizes (e.g., $s_i$, etc.) and/or size ranges of layers may be determined according exponential sequences. For example, each successive size and/or size range may be determined by a scaling factor (e.g., 1.2). Thus, a sequence of sizes or size ranges may follow a sequence, such as 20, 20*1.2, 20*1.2^2, 20*1.2^3, etc. Embodiments, however, are not limited to this example.

This decomposition strategy may provide detection such that no face is missed, regardless of its position and size.

Also, in accordance with this decomposition strategy, a sub-task may comprise scanning operations in a particular detection region. In embodiments, these decomposed sub-tasks are executed in N frames (e.g., in N consecutive frames). In other words, completion of an entire detection task will take N frames. This N frames is referred to herein as a "detection cycle". The detection cycle depends on the number of layers. For instance, more layers result in a longer detection cycle, and a lighter workload in each frame. In embodiments, the number of layers may be four or less to avoid causing a long detection cycle (and thus, a potentially noticeable delay in new face detection due to the long detection cycle). However, embodiments may employ any number of layers.

The example of FIG. 4 illustrates three layers being employed in a quad-tree arrangement. This results in a detection cycle N of 1+4+16=21 frames. Thus, for a video stream rate of 30 frames per second, any new faces will be discovered in less than one second.

As described above, embodiments may advantageously provide enhanced performance over conventional techniques. For example, Table 1, below, provides performance data for different face detection techniques. This data is represented in frames per second, which indicates how fast video frames are processed.

Table 1, below, provides performance data involving the techniques described herein for two clips of video. The first video clip ("Video 1") contains a single face. However, the second video clip ("Video 2") contains multiple faces. Each of these video clips comprises frames that are 640×480 pixels in size.

The performance data of Table 1 shows the detection speed when different numbers of quad-tree layers are employed. For each of these layers, the minimal detection size is set to 32×32 pixels. More particularly, Table 1 shows (in different columns) detection speeds for the employment of one layer decomposition (i.e., pure detection), two layer decomposition, and three layer decomposition.

As indicated in Table 1, two layer decomposition is approximately six times faster than pure detection, while three layer decomposition is approximately eighteen times faster than pure detection. Also, in these examples, two layer decomposition and three layer decomposition both provide face detection accuracy that is comparable to the accuracy of pure face detection.

TABLE 1

| Performance gain for VGA size video | | | |
| --- | --- | --- | --- |
| VGA video | 1 layer (fps) | 2 layers (fps) | 3 layers (fps) |
| Video-1 | 20 | 138 | 366 |
| Video-2 | 28 | 184 | 489 |
| Average | 24 | 161 | 427 |

Figure 5:
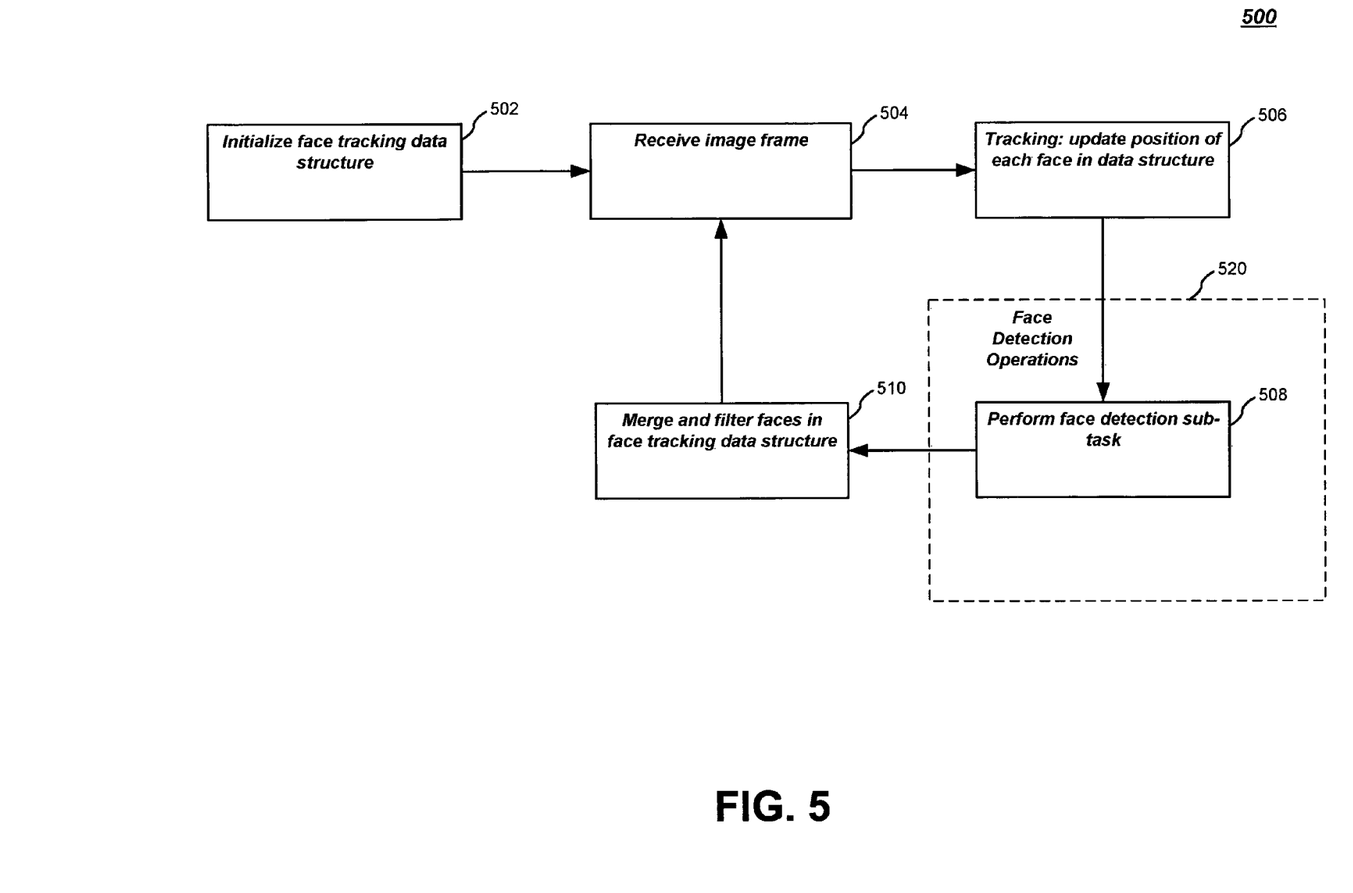
FIGS. 5 and 6 are logic flow diagrams.

As described herein, embodiments provide face detection and face tracking operations. These operations may be combined. Exemplary techniques for face detection and face tracking are described below with reference to FIG. 5. In particular, FIG. 5 illustrates an exemplary logic flow 500, which may be representative of operations executed by one or more embodiments. Although FIG. 5 shows a particular sequence of operations, other sequences may be employed. Moreover, the depicted operations may be performed in various parallel and/or sequential combinations.

FIG. 5 shows that, at a block 502, a face tracking data structure is initialized. The face tracking data structure may maintain various information regarding detected faces. Examples of such information include face location and face size. Further information, such as data regarding particular facial features may also be maintained. Embodiments, however, are not limited to these examples. Face tracking data structures may be implemented in various ways. Exemplary data structures include (but are not limited to) queues, linked lists, arrays, container class objects, and so forth.

At a block 504, an image frame is received. This image frame may be in a sequence of frames (e.g., in a video stream). As described herein, such sequences may be received from an image sensor operating in a camera preview mode.

Tracking operations are performed at a block 506. These operations may involve searching for previously detected face(s) (as indicated by the face tracking data structure). Thus, the position of each face (as well as other information) in the data structure may be updated (if the face is still present). This tracking may involve performing face detection operations within neighboring image space areas of the previously detected face(s). Such operations may involve scanning within these areas. Such scanning may employ the aforementioned techniques of Viola and Jones' and/or Rowley et al. Also, such scanning may employ window sizes corresponding to the previously detected face(s). Embodiments, however, are not limited to these examples.

As shown in FIG. 5, face detection operations are performed within a block 520. These operations are in accordance with the task decomposition techniques described herein. For instance, at a block 508, a face detection sub-task is performed. Such a sub-task may involve scanning one or more detection windows through a detection region, as determined in accordance with the quad-tree approach described herein. Such scanning may employ the aforementioned techniques of Viola and Jones' and/or Rowley et al.

A block 510 follows block 508. At block 510, the face tracking data structure is updated. This may comprise adding newly detected faces into the data structure, and changing data regarding previously detected faces (tracked faces) in the data structure. Further, block 510 may involve merging and/or filtering of faces in the data structure. This is because newly detected faces may overlap with previously detected faces. For instance, a particular face can be detected multiple times at similar scales. Also, an old face can also move into a different detection region. Such merging and filtering may be based on feature data that is generated with each detected face. However, other techniques may be employed.

FIG. 5 shows that, following block 510, operation returns to block 504. At this point, a further image frame is received. Based on this further image frame, the face tracking and detection operations described herein may be performed again.

Figure 6:
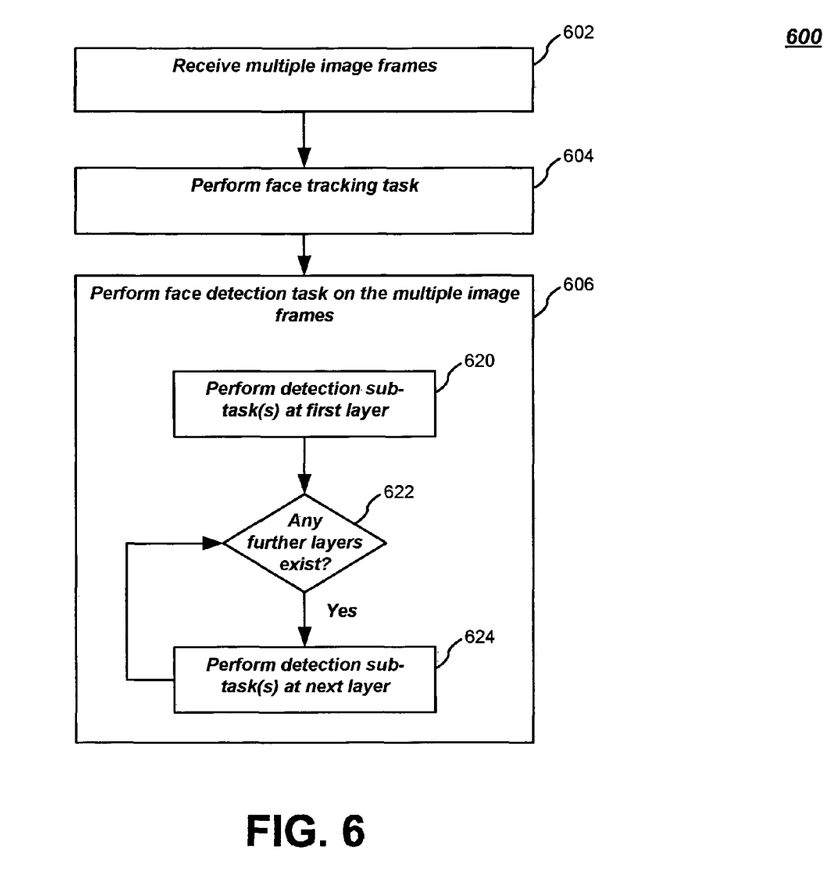

FIG. 6 illustrates an exemplary logic flow 600, which may be representative of various task decomposition operations performed by one or more embodiments. Although FIG. 6 shows a particular sequence of operations, other sequences may be employed. Moreover, the depicted operations may be performed in various parallel and/or sequential combinations.

At a block 602, multiple image frames are received. These frames may be received, for example, from an image sensor. For example, these frames may be a sequence of frames (e.g., a video stream). This sequence may be generated by the image sensor when operating in a digital camera preview mode. Embodiments, however, are not limited to these examples.

At a block 604, face tracking is performed. This may involve scanning for previously detected faces within neighboring areas of their previous detection.

At a block 606, a face detection task is performed on the multiple image frames. This face detection task is decomposed into multiple sub-tasks. This decomposition may employ the quad-tree decomposition techniques described above. These sub-tasks are performed across the plurality of image frames. Thus, block 606 may involve each sub-task being performed with a corresponding frame from the frames received at block 602.

As shown in FIG. 6, block 606 may include blocks 620-624. For instance, at block 620, one or more detection sub-tasks are performed at a first layer. Each of these sub-tasks may involve one or more scanning operations within a detection region. At this first layer, the detection region encompassing the entire image space may be employed.

At a block 622, it is determined whether any further layers exist. If so, then operation proceeds to a block 624. Otherwise, the detection task is complete.

At block 624, one or more detection sub-tasks are performed at a next layer. Each of these sub-tasks may involve one or more scanning operations within a detection region. Multiple detection regions may be employed at this layer. For instance, as described above, four times as many detection regions may be employed as was employed in the previous layer.

FIG. 6 shows that, following block 624, operation returns to block 622. At this point, it is again determined whether any further layers exist in the task decomposition. If so, then block 624 is performed again for a further layer. Otherwise the face detection task has been completed.

Figure 7:
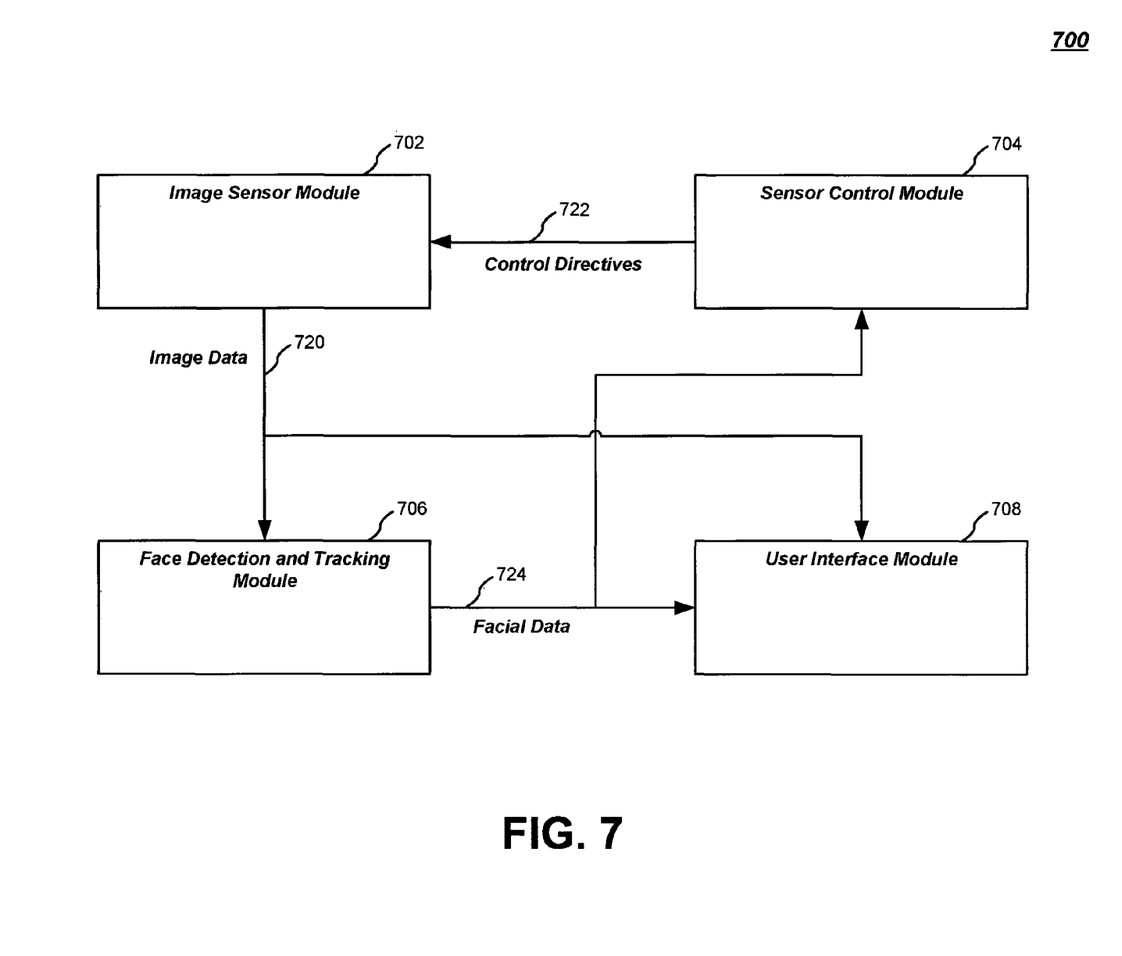
FIG. 7 is a diagram of an exemplary apparatus.

FIG. 7 is a diagram of an apparatus 700 that may employ the techniques described herein. Apparatus 700 may include an image sensor module 702, a sensor control module 704, a face detection and tracking module 706, and a user interface module 708. These elements may be implemented in any combination of hardware and/or software.

Image sensor module 702 generates image data 720 in the form of one or more image frames. These frames are sent to face detection and tracking module 706. In turn, face tracking and detection module 706 may detect and track faces from these frames in accordance with the techniques described herein.

Image sensor module 702 may include various components. Exemplary components include (but are not limited to) an optics assembly, an image sensor, and an image/video encoder. These components may be implemented in any combination of hardware and/or software.

The optics assembly may include one or more optical devices (e.g., lenses, mirrors, etc.) to project an image within a field of view onto multiple sensor elements within the image sensor. In addition, the optics assembly may include mechanism(s) to control the arrangement of these optical device(s). For example, such mechanisms may control focusing operations, aperture settings, exposure settings, zooming operations, shutter speed, effective focal length, etc. Embodiments, however, are not limited to these examples. Such control may be based on control directives 722 received from sensor control module 704.

The image sensor may include an array of sensor elements (not shown). These elements may be complementary metal oxide semiconductor (CMOS) sensors, charge coupled devices (CCDs), or other suitable sensor element types. These elements may generate analog intensity signals (e.g., voltages), which correspond to light incident upon the sensor. In addition, the image sensor may also include analog-to-digital converter(s) ADC(s) that convert the analog intensity signals into digitally encoded intensity values. Embodiments, however, are not limited to these examples. Settings for these operations may be based on control directives 722 received from sensor control module 704.

Thus, the image sensor converts light received through optics assembly into pixel values. Each of these pixel values represents a particular light intensity at the corresponding sensor element. Although these pixel values have been described as digital, they may alternatively be analog. As described above, image sensor module 702 may include an image/video encoder to encode and/or compress pixel values. Various techniques, standards, and/or formats (e.g., MPEG, JPEG, etc.) may be employed for this encoding and/or compression.

Face detection and tracking module 706 receives image data 720. Image data 720 may be in the form of one or more frames. In turn, module 706 detects and tracks faces in accordance with the techniques described herein. Based on this, face detection and tracking module 706 generates corresponding facial data 724. Facial data 724 indicates faces detected and/or tracked within the image data 720. Also, facial data 724 may provide information (location, size, depth, and/or other features) regarding such faces. In embodiments, facial data 724 may be in the form of a face tracking data structure (e.g., as described above with reference to FIG. 4).

FIG. 7 shows that facial data 724 is sent to sensor control module 704. As described above, sensor control module 704 may generate control directives 722, which are provided to sensor module 702. These control directives may establish particular operational characteristics (e.g., focus and/or exposure settings) of sensor module 702. In embodiments, the generation of control directives 722 may be based at least upon facial data 724 (e.g., on the location, size, depth, and/or other features of faces).

User interface module 708 facilitates user interaction with apparatus 700. This interaction may involve the input of information from a user and/or the output of information to a user. Accordingly, user interface module 708 may include one or more devices, such as a keypad, a touch screen, a microphone, and/or an audio speaker. In addition, user interface module 708 may include a display to output information and/or render images/video processed by apparatus 700. Exemplary displays include liquid crystal displays (LCDs), light emitting diode (LED) displays, plasma displays, and video displays.

This display may output frames generated during a preview mode of operation. Additionally, based on operations performed by face detection and tracking module 706, the display may indicate the presence of faces (e.g., by outputting rectangles or other shapes). Accordingly, FIG. 7 shows user interface module 708 receiving image data 720 and facial data 724.

In embodiments, any combination of the elements of FIG. 7 may be included in various components and/or devices. Examples include microprocessors, graphics processors or engines, microcontrollers, application specific integrated circuits (ASICs), and so forth. Further examples include cameras, personal digital assistants (PDAs), mobile phones, smartphones, personal computing devices (e.g., desktop devices, laptop devices, tablet devices, etc.), smart televisions, servers, wearable devices, media players, any smart devices, and so forth. Embodiments, however, are not limited to these examples.

Figure 8:
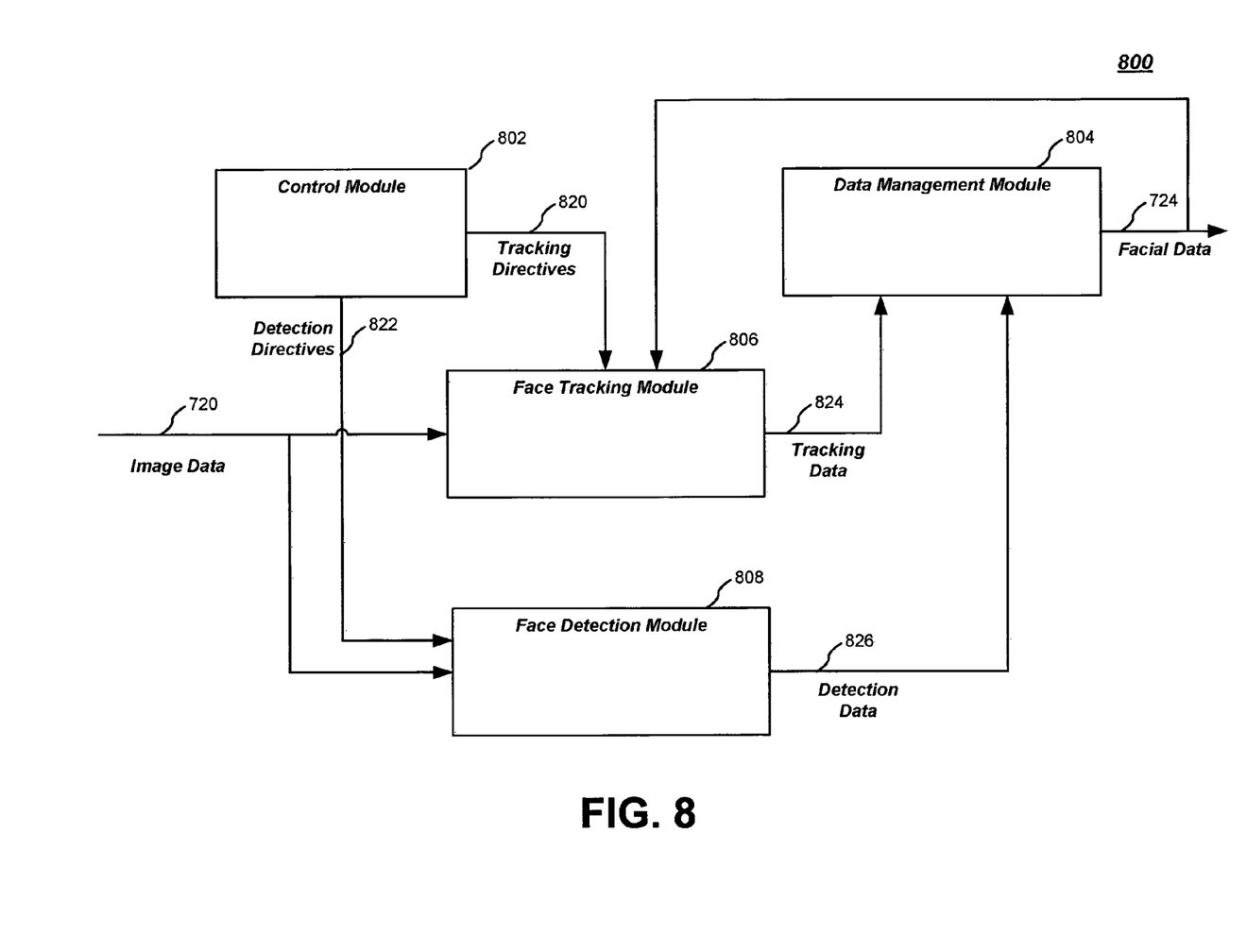
FIG. 8 is a diagram of an exemplary implementation.

FIG. 8 is a diagram of an implementation 800 that may be employed in face detection and tracking module 706. Implementation 800 may include a control module 802, a data management module 804, a face tracking module 806, and a face detection module 808. These elements may be implemented in any combination of hardware and/or software.

Control module 802 controls operations of face tracking module 806 and face detection module 808. For instance, FIG. 8 shows control module 802 sending tracking directives 820 to face tracking module 806. These directives may instruct face tracking module 806 to perform tracking operations. Also, FIG. 8 shows control module 802 sending detection directives 822 to face detection module 808. These directives may instruct face detection module 808 to perform one or more detection sub-tasks. In embodiments, such sub-tasks may be in accordance with a quad-tree task decomposition.

Data management module 804 maintains a face tracking data structure. This data structure is based on tracking data 824 received from face tracking module 806 and detection data 826 received from face detection module 808. Accordingly, data management module 804 may merge and/or filter information contained in this received data. As a result, FIG. 8 shows data management module 804 generating facial data 724.

Face tracking module 806 receives image data 720 and performs face tracking operations, as described herein. This may involve tracking previously detected faces in neighborhoods of their previously known locations. Information regarding previously detected faces may be received from data management module 804 as facial data 724. In embodiments, the tracking operations performed by face tracking module 806 may employ the aforementioned techniques of Viola and Jones and/or Rowley et al.

Face detection module 808 receives image data 720 and performs face detection operations, as described herein. As a result, face detection module 808 generates detection data 826, which is sent to data management module 804. Detection data 826 may indicate detected faces and corresponding information (e.g., characteristics of detected faces). The face detection operations may employ the aforementioned techniques of Viola and Jones' techniques and/or Rowley et al. Moreover, face detection module 808 may perform face detection according to the decomposition techniques described herein.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

As described herein, embodiments may include storage media or machine-readable articles. These may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For instance, embodiments are not limited to the employment of Viola and Jones' face detection techniques.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method of performing a face detection task as a plurality of sub-tasks, comprising:
   receiving a plurality of image frames in a video stream sequence of frames; and
   performing a first face detection sub-task on a single detection window at a first layer on a first one of the sequence of frames, the first layer having a first detection window size range corresponding to a first size of a portion of the first frame;
   performing a second face detection sub-task on a single detection window at a second layer different from the first layer on a second one of the sequence of frames subsequent to the first one of the sequence of frames, the second layer having a second detection window size range corresponding to a second size of a portion of the second frame different from the first size of the portion of the first one of the sequence of frames;
   performing a third face detection sub-task on a single detection window at a third layer different from the first layer and from the second layer on a third one of the sequence of frames subsequent to the second one of the sequence of frames, the third layer having a third detection window size range corresponding to a third size of a portion of the third frame different from the first size and from the second size, wherein the sub-tasks are distributed across multiple frames by performing only one sub-task on each frame;
   generating face detection data based on the performed face detection sub-tasks; and
   sending the face detection data to a data management module.

2. The method of claim 1, wherein said performing comprises, for each sub-task, scanning a window within a detection region, the window having a size within the size range of the corresponding layer.

3. The method of claim 2, wherein the detection region has a size within the size range of the corresponding layer.

4. The method of claim 1:
   wherein the plurality of layers includes a first layer employing a first quantity of detection regions, and a second successive layer employing a second quantity of detection regions; and
   wherein the second quantity is four times greater than the first quantity.

5. The method of claim 4, wherein each detection region corresponds to a sub-task and wherein said performing a second face detection sub-task comprises performing the second face detection sub-task in a next frame of the sequence of frames followed by performing a sub-task for each other detection region at the second layer in sequential frames of the sequence of frames before performing the third face detection sub-task.

6. The method of claim 1, further comprising:
   performing a face tracking task on the plurality of image frames.

7. The method of claim 1, wherein each face detection sub-task causes the detection of faces, the method further comprising maintaining information regarding one or more previously detected faces.

8. An apparatus, comprising:
   a face detection module to receive a video stream sequence of frames, to perform a face detection task on a plurality of image frames, to generate face detection data and to send the face detection data to a data management module,
   the face detection module performing a first face detection sub-task on a single detection window at a first layer on a first one of the sequence of frames, the first layer having a first detection window size range corresponding to a first size of a portion of the first frame,
   performing a second face detection sub-task on a single detection window at a second layer different from the first layer on a second one of the sequence of frames subsequent to the first one of the sequence of frames, the second layer having a second detection window size range corresponding to a second size of a portion of the second frame different from the first size of the portion of the first one of the sequence of frames, and
   performing a third face detection sub-task on a single detection window at a third layer different from the first layer and from the second layer on a third one of the sequence of frame subsequent to the second one of the sequence of frames, the third layer having a third detection window size range corresponding to a third size of a portion of the third frame different from the first size and from the second size,
   wherein the sub-tasks are distributed across multiple frames by performing only one sub-task on each frame.

9. The apparatus of claim 8, wherein said face detection module is to, for each sub-task, scan a window within a detection region, the window having a size within the size range of the corresponding layer.

10. The apparatus of claim 9, wherein the detection region has a size within the size range of the corresponding layer.

11. The apparatus of claim 8:
wherein the plurality of layers includes a first layer employing a first quantity of detection regions, and a second successive layer employing a second quantity of detection regions; and
wherein the second quantity is four times greater than the first quantity.

12. The apparatus of claim 11, wherein each detection region corresponds to a sub-task and wherein said face detection module is to perform a second face detection sub-task in a next frame of the sequence of frames followed by performing a sub-task for each other detection region at the second layer in sequential frames of the sequence of frames before performing the third face detection sub-task.

13. The apparatus of claim 8, further comprising a face tracking module to track one or more previously detected faces within an image frame.

14. The apparatus of claim 13, further comprising a storage medium to store information regarding the one or more previously detected faces.

15. The apparatus of claim 14, wherein the storage medium further stores information regarding any faces detected by one or more face detection sub-tasks.

16. The apparatus of claim 8, further comprising an image sensor to generate a plurality of frames in the video stream sequence of frames.

17. The apparatus of claim 8, further comprising a display to output the image frame.

18. An article comprising a non-transitory machine-accessible medium having stored thereon instructions that, when executed by a machine, cause the machine to:
receive a plurality of image frames in a video stream sequence of frames; and
perform a first face detection sub-task on a single detection window at a first layer on a first one in sequence of the sequence of frames, the first layer having a first detection window size range corresponding to a first size of a portion of the first frame, wherein the face detection task comprises a plurality of face detection sub-tasks, the plurality of sub-tasks allocated among a plurality of layers;
perform a second face detection sub-task on a single detection window at a second layer different from the first layer on a second one in sequence of the sequence of frames subsequent to the first one of the sequence of frames, the second layer having a second detection window size range corresponding to a second size of a portion of the second frame different from the first size of the portion of the first one of the sequence of frames; and
perform a third face detection sub-task on a single detection window at a third layer different from the first layer and from the second layer on a third one in sequence of the sequence of frames subsequent to the second one of the sequence of frames, the third layer having a third detection window size range corresponding to a third size of a portion of the third frame different from the first size and from the second size, wherein the sub-tasks are distributed across multiple frames by performing only one sub-task on each frame;
generate face detection data based on the performed face detection sub-tasks; and
send the face detection data to a data management module.

19. The article of claim 18, wherein performing said face detection task comprises, for each sub-task, scanning a window within a detection region, the window having a size within the size range of the corresponding layer; and wherein the detection region has a size within the size range of the corresponding layer.

20. The article of claim 18:
wherein the plurality of layers includes a first layer employing first quantity of detection regions, and a second successive layer employing a second quantity of detection regions; and
wherein the second quantity is four times greater than the first quantity.

* * * * *